March 31, 1925.

L. F. DOUGLASS 1,531,693

METHOD AND APPARATUS FOR PRODUCING NOVEL AND DOUBLE
IMAGE EFFECTS IN PHOTOGRAPHY

Filed Nov. 12, 1921

Inventor.
Leon F Douglass
Attorney
J.E.Frabucca

Patented Mar. 31, 1925.

1,531,693

UNITED STATES PATENT OFFICE.

LEON F. DOUGLASS, OF MENLO PARK, CALIFORNIA.

METHOD AND APPARATUS FOR PRODUCING NOVEL AND DOUBLE-IMAGE EFFECTS IN PHOTOGRAPHY.

Application filed November 12, 1921. Serial No. 514,692.

*To all whom it may concern:*

Be it known that I, LEON F. DOUGLASS, a citizen of the United States, residing at Menlo Park, county of San Mateo, State of California, have invented a new and useful Improvement in the Method and Apparatus for Producing Novel and Double-Image Effects in Photography, of which the following is a specification.

This invention relates to the method and apparatus for producing on photographic plate or film two images of a single object, said images being produced on said film simultaneously, if desired, and laterally reversed one with the other.

The object of my invention is to provide a novel method and an improved apparatus whereby two images of a single object may be produced simultaneously on a single ordinary width photographic film by one exposure and at the same time have said images reversed as regards each other. For instance, by means of my invention a complete cinematographic film can be made upon which one may be made to appear as fighting a duel with himself. Such photography will require but one exposure and will only necessitate the attachment of the special reversing prism to an ordinary camera, before exposure is made.

Stated briefly, the invention comprises in combination with a sensitized film or plate and a lens for focusing images on to said film, a light refracting member positioned to reverse one image before the same passes through said lens on to said film.

Figure 1:
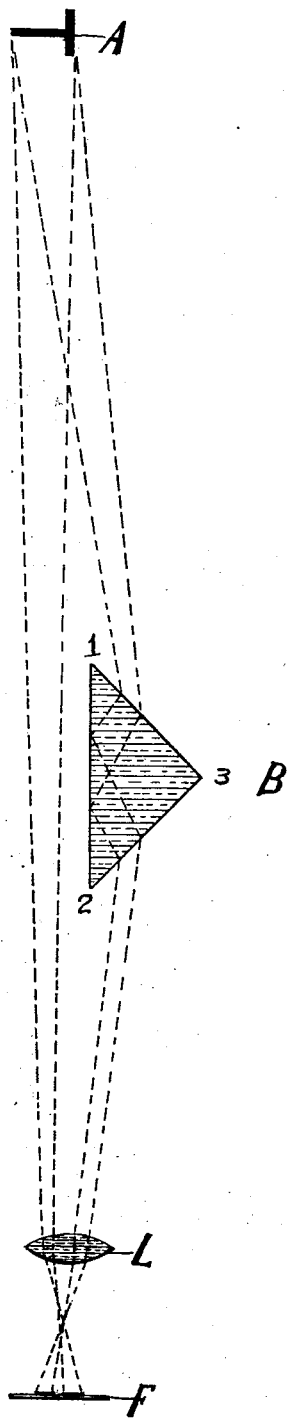
Figure 2:
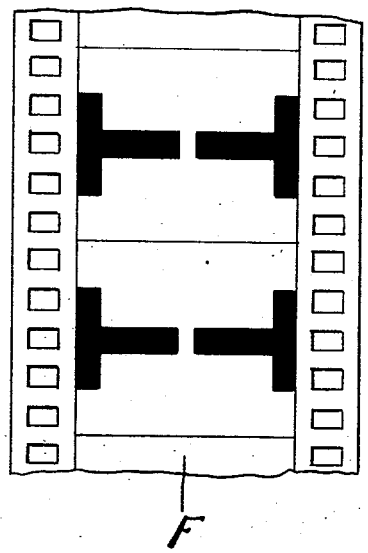

In the accompanying drawings: Fig. 1 is a diagrammatic view illustrating the relative arrangement of the object to be photographed, the light refracting element, the lens, the photographic film, and the path of the light rays proceeding from said object to said film; Fig. 2 represents a fragment of a photographic film upon which are produced two images of a single object, one of which is reversed and the path of the light rays proceeding from said object to said film.

I have found that by placing a properly angled and constructed prism in front of a camera lens, but laterally displaced from the principal axis of said lens, so as to intercept a portion of the light rays proceeding from an object to be photographed, said prism will, by refraction and reflection of said portion of rays, direct a reversed image of the object through the camera lens. Simultaneously, another portion of light rays from the object passes directly to and through the lens. This results in two images being produced on a sensitized film positioned behind said lens, one of said images being reversed relative to the other. I have also found that a right-angle, isosceles prism, i. e., a 45-degree prism, may be satisfactorily employed to produce the above-mentioned novel effect.

Referring to the drawings, which illustrate one embodiment of the present invention, the light rays emanating from the object A proceed to prism B, striking the surface 1—3 of said prism. Said rays upon striking the said surface are refracted against the base 1—2 of prism B, which said surface reflects the said rays to the surface 2—3 of said prism, and upon their coming to the air again, they are refracted and travel through lens L to the sensitized photographic film F, where the image is produced in a vertically inverted position. Another portion of said rays travels through lens L of the camera without interruption to the sensitized photographic film F, upon which the other image in a laterally and vertically inverted position is simultaneously produced. The photographic film F now has upon it two images of the single object A, one reversed as regards the other.

While only one embodiment of the invention is illustrated in the drawings and described with considerable particularity, it is to be expressly understood that the invention is not restricted thereto, as the same may be carried out in a variety of ways and embodied in a variety of forms, the sum of which will now readily suggest themselves to those skilled in the art. Nor am I limited to any certain means for attaching said refracted prism to the camera structure, as it is apparent that any suitable means may be used for placing the said prism in its proper position in reference to the camera lens. Nor am I limited to any particular kind or form of photography, as it is apparent that my invention may be used in connection with both still and motion photography or cinematography. Nor am I limited to the use of any particular character of sensitized element on which the negative is to be formed and the term film as employed in the claims is to be construed as generic to plates or other suitable sensitized elements. Reference is therefore to be had to the claims hereto appended for a definition of the elements of the invention.

What is claimed is:

1. The method of producing two images of a single object on a photographic film which comprises directing a laterally reversed image of said object through a lens onto said film by interposing a light-directing element in the path of a portion of the light rays from said object, and simultaneously allowing another portion of said light rays to proceed directly through said lens onto said film.

2. The method of producing two images of a single object on a photographic film which comprises directing a laterally reversed image of said object through a lens onto said film by interposing a 45 degree prism in the path of a portion of the light rays from said object, and simultaneously allowing another portion of said light rays to proceed directly through said lens onto said film.

3. The method of simultaneously producing two laterally displaced images of a single object on a sensitized film, which comprises refracting and reflecting one image of said object through a prism and a lens onto said film and allowing another image of said object to proceed directly through said lens onto said film.

4. The method of simultaneously producing two images, laterally reversed one with the other, of a single object on a single sensitized surface, which comprises directing a portion of the light rays proceeding from said object through a lens onto said surface by a light-directing member having one side thereof angularly disposed to the principal axis of said lens and permitting another portion of said light rays to pass directly through said lens onto said surface.

5. In a device for producing two images of a single object on a sensitized surface, the combination of a lens, and means laterally displaced from the principal axis of the lens for directing a laterally reversed image of said object through said lens onto the sensitized surface, the rays of light forming the other one of said images passing directly from the object through the lens and onto said surface.

6. A device for producing two images of a single object on a sensitized film comprising a lens, and a light directing element for directing a laterally reversed image of said object through said lens onto the film, said element being laterally displaced from the principal axis of the lens whereby the rays constituting a second image of the same object pass directly through said lens onto the film.

7. A device for simultaneously producing two images of a single object on a sensitized film comprising in combination with a lens, a right angle isosceles prism for directing a laterally reversed image of said object through the lens onto the film, said prism being laterally displaced from the principal axis of said lens whereby a second image of said object is produced on the film.

8. The method of producing two images, laterally reversed one with the other, of a single object on a sensitized film which consists in so positioning a prism between said object and a lens that a portion of the rays of light from the object are directed by the prism through the lens onto the film, and permitting another portion of said rays of light to pass directly through the lens onto the film.

LEON F. DOUGLASS.